Patented Sept. 22, 1925.

1,554,575

UNITED STATES PATENT OFFICE.

EDWIN W. HALE, OF GREENWICH, CONNECTICUT, AND COLIN G. FINK, OF YONKERS, NEW YORK, ASSIGNORS OF ONE-HALF TO THE DORR COMPANY, A CORPORATION OF DELAWARE.

PROCESS FOR THE EXTRACTION OF METALS.

No Drawing. Application filed June 8, 1922. Serial No. 566,848.

*To all whom it may concern:*

Be it known that we, EDWIN W. HALE and COLIN G. FINK, citizens of the United States, residing at Greenwich, in the county of Fairfield and State of Connecticut, and Yonkers, in the county of Westchester and State of New York, respectively, have invented certain new and useful Improvements in Processes for the Extraction of Metals, of which the following is a specification.

Our process relates to the extraction of metals in forms soluble in a solution of bromine.

In the practice of our process bromine is dissolved in a salt solution preferably of a halogen salt in which it is readily soluble and with this liquid the finely ground ore, compound or concentrates containing metal in a form soluble in a solution of bromine are leached, whereby is obtained elemental sulphur (if the metal was originally present as sulphide) and a solution of the bromide of the metal. The sulphur and gangue are removed and the solution is subjected to the action of a current in an electrolytic cell, whereby the metal is deposited and bromine is liberated and held in solution in the liquid. The electrolytic treatment should not proceed to the point of complete deposition of the metal contents, because if that were done the bromine would be thrown out of solution, since it is less soluble in liquid free from halogen salts. Hence, the liquid should be removed from the cell while it contains enough halogen salt to retain in solution the bromine liberated therein. This liquid may then be used to leach a fresh batch of ore or concentrates and the process made a continuous one with small loss of reagents.

The following is an example of one way of practicing our invention but our claims are not limited thereto or thereby:

A convenient method of obtaining the leaching liquid—to wit, bromine dissolved in a solution of a halogen salt—is the following: A solution containing, say, twenty-five grammes of zinc per litre as bromide, or as a mixture of chloride and bromide, is made up. This may be prepared by dissolving the salt or salts in water, or by treating zinc dust with a solution of bromine dissolved in a zinc chloride solution. If a mixture of the two halogen salts is used, they may be in the proportion of one-to-one as regards their contained zinc, or a solution of a mixture of zinc sulphate and zinc bromide may be used. This solution is introduced into an electrolytic cell which may be equipped with carbon plates as electrodes and a current of, say, fifteen amperes per square foot of cathode surface passed between the electrodes. The result is the liberation of bromine, which sinks to the bottom of the cell, not as liquid bromine, but as a solution of bromine in the undecomposed cell liquor. Being at the bottom of the cell, this solution is not exposed to evaporation and loss of bromine into the air. Electrolysis is not carried to the complete extraction of the zinc, or near it, because if it were, the bromine would separate out as liquid bromine undissolved in the electrolyte. If a mixture of chloride and bromide or of sulphate, chloride and bromide of zinc be present, the bromine is the first anion to be liberated, and as chlorine or sulphate is cheaper than bromine, a mixture of the two zinc salts makes a serviceable medium, the zinc chloride or/and zinc sulphate merely acting as a carrier for the liberated bromine. The liquid flowing from the cell, containing free bromine corresponding in equivalent amount to the zinc which has been deposited upon the cathode, is the liquid employed in the leaching process. In place of zinc salts, other salts may be used as carriers of the bromine or bromide.

Having thus obtained a suitable leaching liquid, a continuous process of practicing our invention is the following: Finely ground zinc-sulphide ore, or concentrate of zinc sulphide, is agitated with the above-described liquid, whereby the zinc sulphide is decomposed and forms zinc bromide, and elemental sulphur is left with the gangue matter of the ore. Countercurrent leaching is preferred, the cell liquor richest in bromine coming in contact first with the most thoroughly extracted ore. The resultant liquid is preferably conducted to a purification tank where it is treated with zinc dust in the standard manner to remove copper, cadmium and other removable impurities. If any gold or silver is present it will be thrown out by the zinc dust and can be subsequently recovered. If lead is present in the ore, it is left behind for the most part as lead sulphate, but if any is dissolved as bromide or chloride, it will be removed by the zinc dust treatment. Iron is not extracted with the same rapidity as the zinc in the leaching step, although some does go into solution as the bromide. Some of this separates as a sludge of ferric hydroxide in the electrolytic cell, apparently reaching a point of equilibrium beyond which it does not build up. A certain amount of iron in the product is permissible in a process where chemically-pure zinc is not the object sought. Should there be an undue accumulation of impurities, means may be provided for bleeding the system and thus keeping the impurities within desired bounds. The zinc and bromine may be recovered from the portion bled from the system in any suitable manner.

The purified liquid is then conducted to the electrolytic cell where, as above described, electrolysis is not carried to the complete extraction of the zinc, or to the point where any part of the bromine separates out as liquid bromine undissolved in the electrolyte. The liquid discharged from the electrolytic cell is introduced into agitators containing a fresh batch of ore or concentrate and the system thus becomes a continuous one.

The cathode zinc deposited in the cell is removed and, if preferred, melted, cast into plates and marketed without further purification. The residue from the leaching tanks contains free sulphur in a spongy condition which may be recovered as a marketable product by suitable means, such as distillation and condensation; or the residue may be sold direct to be used in any desired manner—for example, to be converted into surphuric acid.

Instead of applying our process to the extraction of zinc from zinc sulphides, it may be applied to the extraction of other metals in forms soluble in a solution of bromide, where the bromine is regenerated by electrolysis for further leaching.

What we claim is:

1. The step in the process of extracting metals which are in combination with such other elements as to be capable of being decomposed by bromine, which consists in decomposing such metallic compounds by bromine in a solution of a salt in which it is more soluble than in water.

2. The process of extracting metals which are in combination with such other elements as to be capable of being decomposed by bromine, which consists in decomposing such metallic compounds by bromine in a solution of a salt in which it is more soluble than in water, partially depositing the metal therefrom by electrolysis, discontinuing the electrical action while the liberated bromine remains in solution and using the solution of bromine resulting therefrom to treat additional compound of metal.

3. A step in the process of extracting zinc from zinc sulphide which consists in dissolving the zinc of the sulphide in bromine dissolved in a solution of a salt in which it is more soluble than in water.

4. The process of extracting zinc from zinc sulphide which consists in dissolving the zinc of the sulphide in a solution of bromine in a salt solution in which it has greater solubility than in water and depositing the zinc therefrom by electrolysis.

5. The process of extracting zinc from zinc sulphide which consists in leaching with bromine or compounds yielding bromine in solution for combination with zinc and subsequently depositing the metal and regenerating the bromine by electrolysis.

6. The process of extracting zinc from zinc sulphide which consists in dissolving the zinc of the sulphide in bromine dissolved in a solution of a salt in which it is more soluble than in water, partially depositing the zinc therefrom by electrolysis, discontinuing the electrical action while the liberated bromine remains in solution and using the solution of bromine and bromide resulting therefrom to treat additional zinc sulphides.

7. The process of extracting metals and sulphur from those metallic sulphides which are decomposible with bromine, which consists in decomposing such metallic sulphides by bromine dissolved in a solution of a salt in which it is more soluble than in water and depositing the metal therefrom, and thereby regenerating the bromine, by electrolysis.

8. The process of extracting zinc and sulphur, which consists in decomposing zinc sulphide by bromine dissolved in a solution of a salt and depositing the zinc therefrom, and thereby regenerating the bromine, by electrolysis.

EDWIN W. HALE.
COLIN G. FINK.